United States Patent [19]

Dye et al.

[11] 3,859,854

[45] Jan. 14, 1975

[54] APPARATUS FOR MEASURING A LIQUID DISCHARGE

[75] Inventors: John F. Dye; William J. Binard, both of Barrington; Leonard R. Anglada, Arlington Heights, all of Ill.

[73] Assignee: The Kendall Company, Walpole, Mass.

[22] Filed: May 14, 1973

[21] Appl. No.: 360,218

[52] U.S. Cl. .................................................. 73/215
[51] Int. Cl. .............................................. G01f 1/00
[58] Field of Search ................... 73/215, 216, 421 R; 128/2 F, 495

[56] References Cited
UNITED STATES PATENTS

| | | | |
|---|---|---|---|
| 1,042,097 | 10/1912 | Englebright | 73/215 |
| 1,215,674 | 2/1917 | Lyman | 73/215 |
| 2,648,981 | 8/1953 | Drake, Jr. | 73/215 |

*Primary Examiner*—Herbert Goldstein
*Attorney, Agent, or Firm*—Powell L. Sprunger

[57] ABSTRACT

Apparatus for measuring a discharge of liquid comprising, a hollow receptacle having an inlet port adjacent its upper end to receive the discharge. The receptacle includes a cup-shaped pan below the inlet port to receive the liquid, and a chamber below the pan. A bore extends through the pan for passage of liquid into the chamber to measure the period of time for the discharge, and an upper edge of the pan directs overflow from the pan into a lower part of the receptacle. The receptacle includes an upright wall which at least partially defines the sides of a compartment below the pan edge to receive liquid overflow and a channel adjacent the compartment, with the wall having opening means communicating between the compartment and channel for passage of liquid from the compartment to the channel. Means is provided for indicating the approximate maximum height of liquid collected in the compartment during the discharge for determining the approximate peak flow rate of the liquid discharge. Means is also provided for determining the total volume of the liquid discharge, and the average flow rate of the discharge may be determined from the measured volume and the time period of the discharge.

36 Claims, 12 Drawing Figures

APPARATUS FOR MEASURING A LIQUID DISCHARGE

CROSS-REFERENCE TO RELATED APPLICATIONS

"Flow Measuring Device," Ser. No. 360,217, filed May 14, 1973, invented by Anthony J. Ciarico, and assigned to the assignee of the present application; "Flow Measuring Apparatus," Ser. No. 360,214, filed May 14, 1973, invented by the applicants of the present application, and assigned to the assignee of the present application; "Time Measuring Device," Ser. No. 360,219, filed May 14, 1973, invented by John F. Dye, one of the applicants of the present application, and assigned to the assignee of the present application; and "Flow Measuring Apparatus Having a Colorimetric Urine Indicator," Ser. No. 360,235, filed May 14, 1973, invented by Shu-Sing Cheng and assigned to the assignee of the present application.

BACKGROUND OF THE INVENTION

1. Field of the Invention

This invention relates to an apparatus for measuring a discharge of liquid.

2. Description of the Prior Art

In the past, it has been found desirable to obtain various data pertaining to a liquid discharge. In particular, it was discovered that many urological problems could be readily diagnosed by analyzing information obtained during the natural voiding of urine by patients. Presently, various types of devices are utilized to obtain data on the urine stream, such as total volume, average flow rate, force, velocity, and configuration of the stream.

Most of these devices have suffered from less than total reliability because they have required the presence of one or more observers while the patient is voiding. It is obvious that administration of such devices in this manner creates sufficient psychological difficulties for many of the patients to effect voiding. Consequently, if the patients void at all, the potentially erroneous data obtained may result in a false diagnosis and a loss of confidence in the device by the physician. A further complication arises from the fact that many of these devices are rather bulky, and somewhat difficult to use.

Lane, Jr. U.S. Pat. No. 3,499,327 discloses a device to divert the beginning and middle portions of the urine stream into separate chambers. Profy U.S. Pat. No. 3,561,427 relates to a device which collects urine in a plurality of rotating containers over a period of time. Coanda Re. U.S. Pat. No. 26,964 shows a container which measures the volume of urine over a period of time. De Bella U.S. Pat. No. 3,362,400 discloses a device for measuring specific gravity and the volume of liquid collected over a period of time. The related applications "Flow Measuring Device" and "Flow Measuring Apparatus" disclose devices to measure the peak flow rate of a liquid discharge, while the related application "Time Measuring Device" discloses a device to measure the period of time of a liquid discharge.

SUMMARY OF THE INVENTION

A principal feature of the present invention is the provision of apparatus for measuring a discharge of liquid of simplified and compact construction, and which may be self-administered by a patient.

The liquid measuring apparatus of the present invention comprises, a hollow receptacle having an inlet port adjacent its upper end to receive the liquid discharge. The receptacle includes a cup-shaped pan below the inlet port to receive the liquid, and the pan has a bore extending through the pan at a lower portion thereof, with an upper edge of the pan directing overflow liquid from the pan into a lower part of the receptacle. The receptacle has a chamber below the pan and communicating with the pan bore to collect liquid passing through the pan bore. The receptacle also includes an upright wall which at least partially defines the sides of a compartment below the pan edge to receive liquid overflowing from the pan and a channel adjacent the compartment. The wall has opening means communicating between the compartment and channel to permit passage of liquid from the compartment to the channel as the liquid collects in the compartment. Means is also provided for indicating the approximate maximum height of liquid collected in the compartment during the liquid discharge.

A feature of the present invention is that the duration of time for the liquid discharge may be determined by the height of liquid collected in the chamber.

Another feature of the present invention is that the approximate peak flow rate of the liquid discharge may be determined from the indicating means.

The measuring apparatus may also include a container below the receptacle, and a conduit connecting the channel and container to direct liquid from the channel to the container for collection therein. The apparatus may include means for emptying the liquid collected in the chamber into the container.

Thus, a feature of the present invention is that the total volume of the liquid discharge may be determined by emptying the chamber into the container.

Another feature of the invention is that the average flow rate of the liquid discharge may be determined by the height of liquid collected in the chamber which indicates voiding time and the total volume of liquid collected in the container.

Further features will become more fully apparent in the following description of the embodiments of this invention and from the appended claims.

DESCRIPTION OF THE DRAWINGS

In the drawings:

FIGS. 6–9 are fragmentary views of another embodiment of the liquid measuring apparatus of the present invention in which:

FIG. 6 is a sectional view of the bottom portion of the apparatus taken along the line 6—6 of FIG. 8;

FIG. 7 is a fragmentary sectional view of the liquid measuring apparatus of FIG. 6, taken substantially as indicated along the line 7—7 of FIG. 6;

FIG. 9 is a top view of the liquid measuring apparatus of FIG. 6;

DESCRIPTION OF THE PREFERRED EMBODIMENTS

Figures 1, 2, 3:
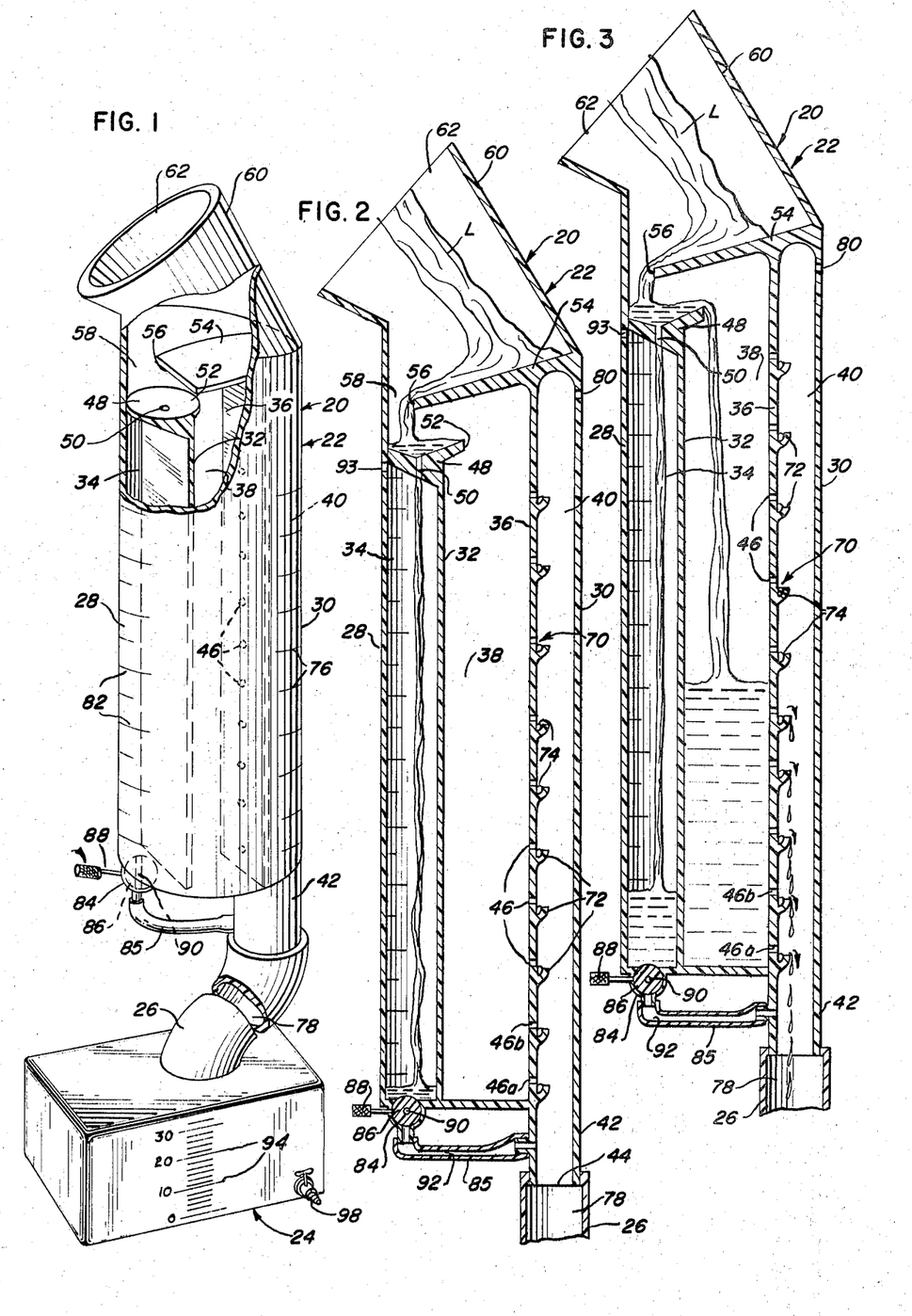
FIG. 1 is a fragmentary perspective view, partly broken away, of the liquid measuring apparatus of the present invention.
FIG. 2 is a fragmentary sectional view of the liquid measuring apparatus of FIG. 1, during initiation of a liquid discharge into the apparatus.
FIG. 3 is a fragmentary sectional view of the liquid measuring apparatus of FIG. 1, during passage of the discharge into the apparatus at its peak flow rate.

Referring now to FIGS. 1 and 2, there is shown an apparatus, generally designated 20, for measuring a discharge of liquid. The apparatus 20 includes a hollow receptacle designated generally 22, a hollow container designated generally 24 positioned under the receptacle 22, and a conduit 26 connecting the receptacle and container 22 and 24. However, if desired, the container 24 may be made integral with the receptacle at its lower end. Preferably, the receptacle and container are made from a suitable transparent material, such as plastic.

The receptacle 22 has a front wall portion 28, a back wall portion 30, and a first upright wall 32 in the receptacle which partially defines a chamber 34 intermediate the first wall 32 and the front wall portion 28. The receptacle 22 also has a second upright wall 36 in the receptacle which is spaced from the first wall 32. The first and second walls 32 and 36, along with the sides and bottom of the receptacle, define a compartment 38 in the receptacle adjacent the chamber 34, and the second wall 36 and the back wall portion 30 defines a vertical channel 40 in the receptacle adjacent the compartment 38. Preferably, the receptacle includes a depending tubular extension 42 defining a lower portion of the channel 40 and an exit port 44. In one embodiment of the invention, the second wall 36 has a plurality of vertically spaced apertures 46 or opening means, which may be aligned in a row, for a purpose which will be described below.

A cup-shaped pan 48 covers the upper end of the chamber 34 adjacent the front wall portion 28, and the pan 48 has a bore 50 extending through the pan at a lower portion thereof and communicating with the chamber 34. The pan 48 also has an upper edge 52 adjacent the compartment 38. An inner baffle 54 extends downwardly from the back wall portion 30 above the compartment 38 and channel 40, and the baffle terminates at a lower edge 56 above the pan 48, such that the edge 56 defines an opening 58 between the edge 56 and front wall portion 28. The receptacle includes a tapered portion 60, which may be frusto-conical in shape, adjacent the upper end of the receptacle above the baffle 54 and defining an inlet port 62.

In operation, the receptacle is positioned to receive a discharge of liquid, such as a urine stream during voiding, through the inlet port 62, and the functioning of the receptacle during the initial stage of the liquid discharge L is illustrated in FIG. 2. As the liquid discharge L passes into the receptacle through the inlet port 62, the tapered portion 60 directs the discharge L toward the rearward part of the receptacle and against the baffle 54. The baffle 54 breaks the discharge by reducing the force and velocity of the stream to prevent turbulence in the rest of the receptacle, and it directs the discharge over the lower edge 56 of the baffle 54 into the pan 48 in a lower part of the receptacle. A portion of the liquid which collects in the cup-shaped pan 48 then begins to pass through the bore 50 into the chamber 34 for collection in the lower part of the chamber. Preferably, the pan 48 is relatively shallow, and the liquid will pass through the bore 50 at a fairly constant rate, since the height of liquid collected in the pan does not vary to an appreciable extent. Passage of liquid into the chamber 34 is facilitated by an opening 93 adjacent the upper end of the chamber and communicating between the chamber and the atmosphere to vent the chamber.

Because the liquid discharge into the pan 48 collects faster than it passes through the bore 50, the level of liquid in the pan quickly builds up and overflows over the upper edge 52 of the pan into the compartment 38, as shown in FIG. 3. Preferably, the diameter of the bore 50 of the pan 48 is relatively small, and overflow of the pan will occur shortly after initiation of the liquid discharge. After the pan 48 overflows, the liquid simultaneously passes through the bore 50 into the chamber 34 and also into the compartment 38.

Once the liquid overflows into the compartment 38, it collects in the lower part of the compartment until it reaches the height of the lowest aperture 46a. At this stage, the liquid drains through the aperture 46a into the channel 40, and the liquid continues to pass through the lowest aperture 46a into the channel 40 as long as the height of liquid in the compartment 38 remains above the lowest aperture 46a. For a period of time, which may be relatively brief, the rate of liquid flow through the aperture 46a may be sufficiently high to offset a slight increase in flow rate of the liquid discharge into the receptacle. However, as the flow rate of the liquid discharge into the receptacle increases, liquid may overflow into the compartment 38 at a greater rate than the rate at which it drains through the lowest aperture 46a, and the liquid may then collect in the compartment 38 to the height of the second lowest aperture 46b. Once the liquid raises to this height, it then drains into the channel 40 through both of the lower apertures 46a and b, as indicated by the direction of the arrows in FIG. 3. As the rate of flow of the liquid discharge into the receptacle further increases, the liquid may collect in the compartment 38 at a rate higher than the rate at which it passes through the two lower apertures 46a and b, and the height of liquid in the compartment may raise to a sufficiently high level, such that it eventually drains into the channel 40 through a number of apertures 46, as shown in FIG. 3. When the flow rate of the discharge abates, the liquid drains from the compartment 38 into the channel 40 faster than it overflows from the pan 48 into the compartment, and the height of liquid in the compartment begins to subside.

Peak flow rate of the incoming liquid discharge may be defined as the maximum rate of flow of the discharge. Since the height of liquid in the compartment raises or lowers responsive to an increase or decrease, respectively, of the flow rate of the incoming discharge, it is apparent that the maximum height of liquid attained in the compartment during the discharge serves as an indication of the approximate peak flow rate of the discharge. Although anomalies in the discharge, such as a momentary surge of the discharge, may not be ultimately reflected in the maximum liquid height in the compartment, due, in part to the lag between the time the discharge enters the receptacle and the time it enters the compartment, the apparatus determines the peak flow rate with sufficient accuracy for such purposes as are under discussion. In particular, a urine stream during voiding has a relatively slow rate of change of flow rate, and apparatus of the present invention indicates a peak flow rate for the discharge which is sufficiently accurate for purposes of diagnosing a patient.

It is possible that the approximate peak flow rate of the urine discharge may be determined by observing the highest level of liquid accumulation in the compartment 38 during the discharge. Direct reading by the patient may be impractical or difficult during self-administration of the apparatus as thus far described, if the apparatus 20 is utilized to collect a discharge of liquid during voiding, and it is desirable that the apparatus be self-administered by the patient in order to alleviate any psychological problems of the patient which might be caused by observation of the receptacle during voiding. Accordingly, means, generally designated 70, is provided for indicating the approximate maximum height of liquid collected in the compartment during the liquid discharge. The indicating means 70 may take the form of a plurality of upwardly directed flanges 72 in the channel 40, with each of the flanges 72 being positioned below an aperture 46 and retaining a liquid indicating material 74 against the wall 36 below each of the apertures 46 in the path of the liquid flow therefrom. In one embodiment to the invention, the indicating material 74 may be a wettable material, such as cotton, and the material below each of the apertures 64 indicates whether liquid has passed through an individual aperture by its wet or dry appearance. It is also contemplated that a liquid or urine sensitive material, such as a material which changes color upon contact with the liquid, for example, a methylene blue compound or rhodamine may be utilized as the indicating material 74. The contrast change may be reversible as the material dries, thus rendering the indicating material and the apparatus for further use, if desired.

The indicating means 70 thus provides an indication is discrete levels of the liquid height in the compartment during the discharge, and the corresponding variation in flow rate of the liquid discharge. Indicia 76 on the receptacle, as shown in FIG. 1, may be utilized to indicate the peak flow rate of the liquid discharge based on the indicating means. In order to determine the peak flow rate of the discharge after voiding is complete, the highest level of liquid drainage through the apertures 46 is first determined by the indicating means 70, and a reading of peak flow rate from the indicia 76 is then ascertained at this point.

It is apparent that the rate of drainage from the compartment 38 into the channel 40 is dependent upon the precise structure of the receptacle. For example, the apertures 46 may be made relatively small to cause a relatively high column of liquid to accumulate in the compartment 38, resulting in a greater sensitivity of the receptacle to a change in flow rate of the discharge. Similarly, the higher apertures 46 may be larger than the lower apertures, or the spacing between the higher apertures may be closer together than the lower apertures to obtain a greater sensitivity of the device within an expected abnormal range of values for the peak flow rate of the discharge. Finally, the cross sectional area of the compartment 38 itself may be selected of a suitable size to provide the desired sensitivity of liquid column height for an accurate determination of peak flow rate.

It is contemplated that a particular structure for the receptacle would first be established, dependent on the accuracy desired and the expected range of values for the peak flow rate of the liquid discharge. Next, the receptacle could be calibrated against known constant flow rates of a discharge passing into the receptacle to determine the appropriate location for the indicia 76 on the receptacle. That this may readily be accomplished is apparent from the fact that the peak flow rate for a discharge having a constant flow rate is the value of the constant flow rate itself. Accordingly, when the discharge of constant flow rate is directed into the receptacle, liquid rises in the compartment to a level at which liquid overflowing into the compartment is offset by the liquid draining from the compartment into the channel, and the receptacle is marked at this height for peak flow rate by the value of the flow rate of the constant discharge.

It should be noted at this point that the passage of liquid through the bore 50 of the pan 48 does not detract from an accurate determination of the peak flow rate of the liquid discharge. Once the liquid overflows from the pan 48 into the compartment 38, the pan retains a head of liquid of fixed height until the liquid discharge itself nearly terminates. Accordingly, the head of fixed height in the pan exerts a constant pressure on liquid passing through the bore 50, and the liquid thus passes from the pan 48 into the chamber 34 at a uniform rate. Consequently, an increase in the rate of flow of the liquid discharge into the receptacle results in a corresponding increase in rate of overflow of liquid from the pan 48 into the compartment 38.

As shown in FIGS. 1 and 3, the liquid draining from the compartment 38 into the channel 40 flows from the channel 40 into a lumen 78 in the conduit 26, and the liquid then passes from the conduit into the container 24 for collection. As shown in FIG. 3, the liquid flow from the channel 40 to the container 24 may be facilitated by an opening 80 adjacent the upper end of the channel 40 and communicating between the channel 40 and the atmosphere which serves to vent the channel 40.

Figure 4:
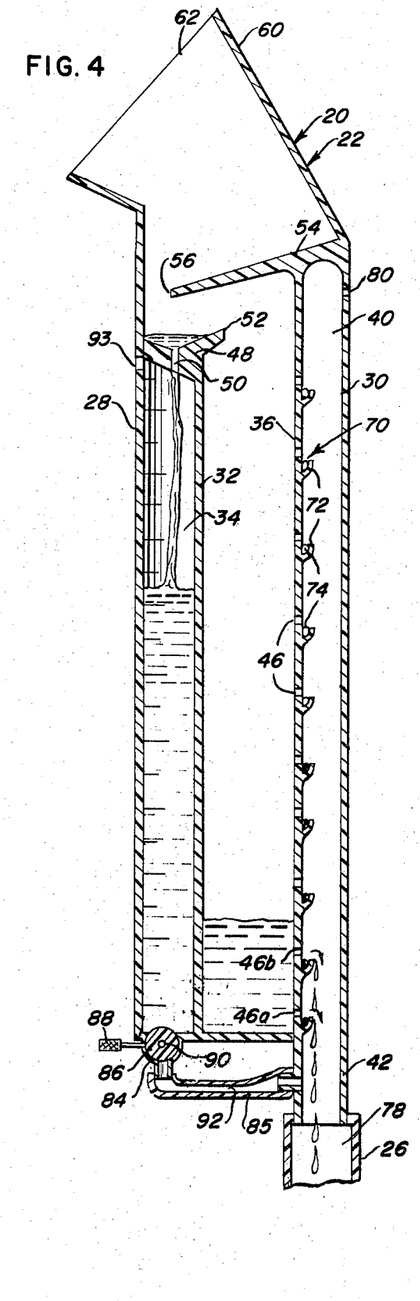
FIG. 4 is a fragmentary sectional view of the liquid measuring apparatus of FIG. 1, after completion of the discharge and during the terminal stages of collection of liquid in the apparatus.

As the rate of flow of the liquid discharge into the receptacle abates, the height of liquid in the compartment 38 subsides, and the peak flow rate on the indicating means 70 has already been determined. However, the liquid in the pan 48 continues to overflow into the compartment 38 until the flow rate of liquid passing into the pan 48 from the baffle 54 is less than the flow rate of the liquid through the pan bore 50 into the chamber 34. Due to the relatively small flow capacity of the bore 50, the overflow condition of the pan may continue until the discharge into the receptacle has terminated, as illustrated in FIG. 4. Although the discharge no longer passes into the pan 48 and overflows from the pan into the compartment 38, the liquid continues to drain from the pan through the bore 50 into the chamber 34 until the pan itself is empty. During this time, liquid remaining in the compartment 38 continues to drain through the channel into the container 24. Calibration of volume measurements on the container 24, discussed below, may be adjusted to take into account any constant volume of residual liquid which remains in the compartment 38 after the discharge has been completed. Once the liquid from the compartment 38 has been drained into the container 24, the volume of liquid collected in the container is equal to the volume of the liquid discharge less the volume of liquid retained in the chamber 34. As will be seen below, the chamber 34 may be calibrated in units of volume, as well as time, if desired, to determine the total volume of the liquid discharge.

The total time period taken for the liquid discharge may now be determined by the height of liquid collected in the chamber 34. This follows since the rate of liquid flow into the chamber 34 has been nearly constant during the total period of voiding. In particular, in the time period during which the pan overflows into the compartment 38, a head of liquid of constant height has been maintained in the pan to exert a constant pressure on the liquid flowing from the pan through the bore 50, and resulting in a uniform flow rate of liquid into the chamber 34 during this period. During initiation of the liquid discharge, the head of liquid in the pan 48 rises from a zero level to its constant level during overflow from the pan into the compartment 38. However, due to the shallowness of the pan and small size of the bore 50, this buildup of the liquid head occurs in a relatively short period of time, and the rate of flow into the chamber 34 is nearly constant. When the liquid discontinues overflowing into the compartment 38 at the termination of the discharge, a fixed volume of liquid drains into the chamber 34 and is compensated for in the calibration of the chamber 34, described below.

Thus, since the flow rate of liquid from the pan into the chamber 34 has been nearly constant throughout the liquid discharge, the period of time for the total discharge may readily be determined by the height of the liquid collected in the chamber 34. Accordingly, the receptacle is calibrated by indicia 82, such as in seconds, to determine the time period for the liquid discharge, and the height of liquid collected in the chamber 34 is utilized to take a reading of time from the indicia 82. It is apparent that calibration of the chamber is facilitated if the chamber has a uniform cross sectional area from the bottom of the chamber to slightly below the bottom of the pan, since the indicia 82 will have a linear relationship in this case.

The receptacle 22 also includes means for emptying the chamber 34 into the channel 40 and container 24. The emptying means comprises valve means 84 adjacent the lower end of the chamber 34 for selectively opening and closing the chamber, and an exit tube 85 communicating between the valve means 84 and the channel 40. Any suitable valve may be utilized for the valve means 84. However, in one embodiment of the invention, the valve means may have a spherical valve portion 86, as shown in FIG. 1, with a handle 88 extending from the spherical portion 86 for turning the spherical portion. A passageway 90 extends centrally through the spherical portion 86, and communicates between the chamber 34 and a lumen 92 in the exit tube 85 in the open position of the valve means, as shown in FIG. 1. To close the valve means 84 and the chamber 34, the handle 88 is turned, as indicated by the direction of the arrow shown in FIG. 1, into a position at which the central passageway 90 no longer communicates with the chamber 34 or lumen 92, as shown in FIG. 2.

Figure 5:
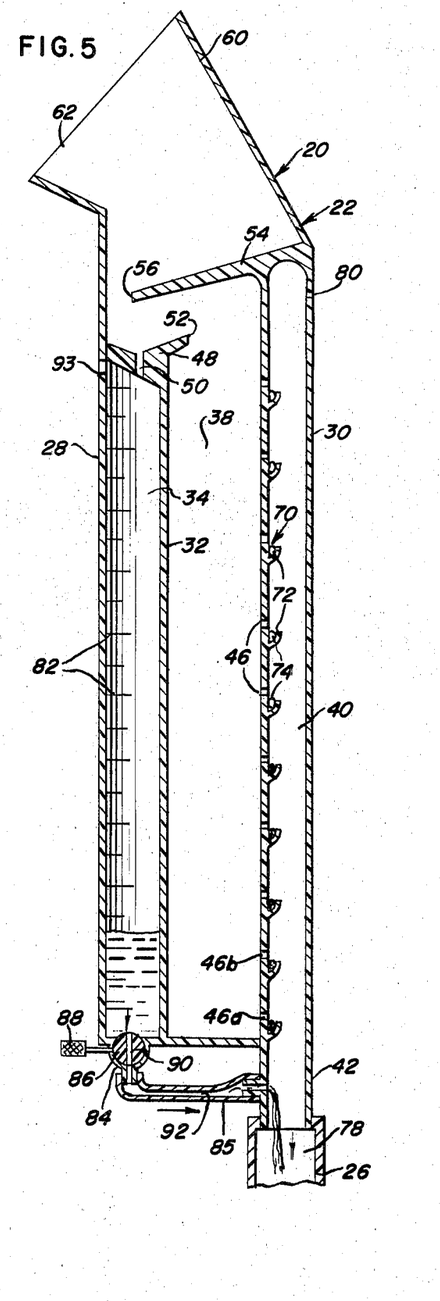
FIG. 5 is a fragmentary sectional view of the liquid measuring apparatus of FIG. 1, showing valve means being opened to empty liquid from a chamber into a channel in the receptacle.

After a reading of time has been taken from the indicia 82, the valve means 84 is opened, as shown in FIG. 5, and liquid drains from the chamber 34, through the central passageway 90 of the valve means, the lumen 92 of the exit tube 85, the channel 40, and the lumen 78 of the conduit 26 into the container, as indicated by the direction of the arrows in the drawings. The chamber 34 is vented to the atmosphere through the opening 93 and the bore 50 to facilitate drainage of the chamber.

After drainage of the liquid from the chamber 34 into the container 24, the container retains the total volume of the liquid discharge. Accordingly, the total volume of the liquid discharge may be determined by graduated indicia 94 on the container 24, as shown in FIG. 1, as indicated above, the indicia 94 may be calibrated to compensate for a volume of residual liquid remaining in the compartment 38. Also, since the total volume of the liquid discharge may be determined by the indicia 94, and the time period for the liquid discharge has already been determined by the indicia 82, the average flow rate of the liquid discharge may readily be determined by simply dividing the value for the total volume of the liquid discharge by the value for the time period of the liquid discharge perviously determined.

In use of the apparatus 20 by a patient, the valve means 84 is first closed and the device is given to the patient for voiding. Since the patient may use the device without observation, unnatural voiding or failure to void which normally occur from psychological difficulties when a patient voids under observation are prevented. After voiding, the patient merely summons the physician or nurse, who first determines the peak flow rate and total time period of the liquid discharge. The valve means 84 is then opened to empty the chamber 34 into the container 24, and the total volume of the liquid discharge is next determined. Finally, the average flow rate of the liquid discharge may be determined from the total volume and the time period for the liquid discharge. If desired, the container 24 may then be removed from the conduit 26 to obtain a specimen of urine, or the specimen may be taken through a valve 98 on the container 24, as shown in FIG. 1.

It is apparent that the precise shape of the portion 60 of the receptacle is not critical, and it is contemplated that various shapes may be utilized to define the inlet port 62, such that the receptacle is suitable for the sex of the particular patient using the device. It is also contemplated that a funnel may be removably attached to the upper portion of the receptacle to receive the liquid discharge.

Figures 6, 7, 9:
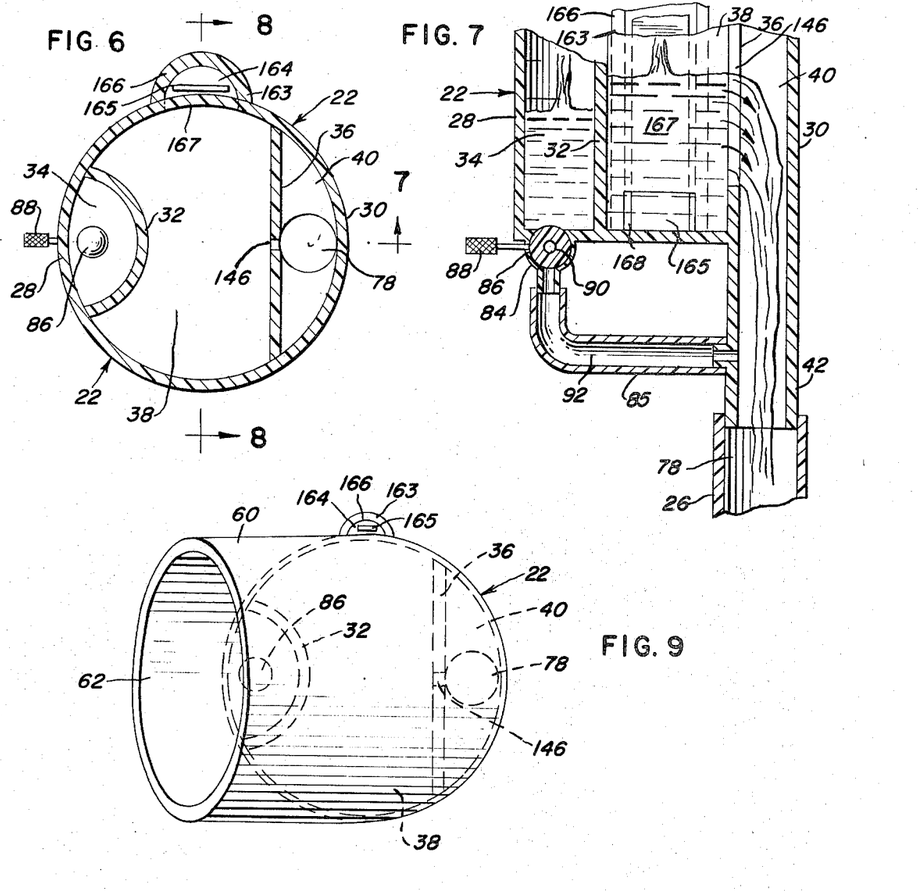
Figure 8:
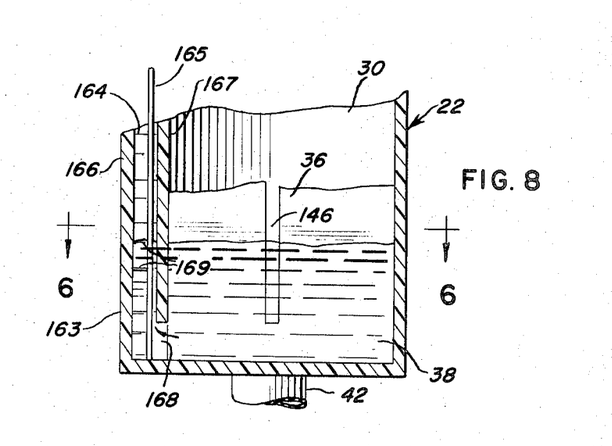
FIG. 8 is a fragmentary sectional view of the liquid measuring apparatus of FIG. 6, taken substantially as indicated along the line 8—8 of FIG. 6.

Another embodiment of the invention is illustrated in FIGS. 6–9, which is similar to the measuring apparatus described in connection with FIGS. 1–5, with like reference numerals designating like parts, except for the indicating and opening means. In this embodiment of the invention, as illustrated in FIGS. 6, 7, and 8, the opening means in the second wall 36 comprises a vertical slot 146, rather than a plurality of apertures. Thus, as indicated by the direction of the arrows in FIG. 7, liquid passes from the compartment 38 to the channel 40 through the slot 146 during the liquid discharge. As the rate of flow of the discharge into the receptacle 22 increases, the liquid level in the compartment 38 rises, and liquid passes from the compartment 38 to the channel 40 through a greater vertical portion of the slot 146. Thus, as liquid rises in the compartment the rate of flow of liquid from the compartment 38 to the channel 40 increases, such that the maximum height of liquid attained in the compartment 38 during the liquid discharge is an indication of approximate peak flow rate of the discharge, in a manner similar to that described in connection with the apparatus of FIGS. 1–5. As previously described, the apparatus is particularly suited to measure the approximate peak flow rate of a urine discharge during voiding.

Although various ways are contemplated for determining the maximum height of liquid reached in the compartment 38 during the liquid discharge, a preferred embodiment is illustrated in FIGS. 6–9. A wall section 163 of the receptacle defines a vertical passageway 164 for insertion of an indicating strip 165 which has a sufficient length to at least extend from the bottom of the compartment 38 to the top of the slot 146. The wall section 163 has an outer wall 166 and an inner wall 167, with the inner wall separating the passageway 164 and compartment 38. As shown in FIGS. 7 and 8, the inner wall 167 is spaced from the bottom of the receptacle and defines an opening 168 in the lower part of the receptacle, such that the compartment 38 communicates with the passageway 164 through the opening 168. Thus, as shown in FIG. 8, liquid passes from the compartment 38 into the passageway 164, as indicated by the direction of the arrow in the drawing, and the maximum liquid height attained in the compartment 38 during the liquid discharge will also be proportionally reached in the passageway 164.

The indicating strip 165 is sensitive to contact by liquid, and, in particular, to contact by urine, and will indicate the maximum height liquid reaches in the passageway 164 and compartment 38 during the liquid discharge. Hence, the indicating strip 165 may be utilized to determine the peak flow rate of the liquid discharge. As shown in FIG. 9, the indicating strip 165 may be inserted into the passageway from the top of the receptacle, and it is pushed downwardly in the passageway 164 until the bottom of the strip rests upon the bottom wall of the receptacle. It should be noted that the inner wall 167 prevents premature contact of the liquid and indicating strip 165 as liquid pours into the compartment 38 during the discharge, as best illustrated in FIGS. 7 and 8, which otherwise might result in an erroneous indication on the strip, and liquid can only enter the passageway 164 through the lower opening 168. Either the indicating strip 165 or, as shown in FIG. 8, the wall section 163 may include calibrated indicia 169 to facilitate a direct reading of peak flow rate from the indicating strip after the liquid discharge is completed.

Any suitable material may be utilized for the indicating strip 165 which is sensitive to contact by the liquid being measured, as previously explained for the indication material, such as the indicator disclosed in the above-identified related application "Flow Measuring Apparatus Having a Colorimetric Urine Indicator."

Although the opening means is shown as a vertical slot 146 having parallel sides, it is contemplated that the slot may be widened or narrowed at desired vertical positions to increase or decrease the flow rate of liquid through the wall 36 in that area, and the wall 36 may also have a plurality of slots and/or apertures serving as opening means, if desired. It is also apparent that the indicating means described in connection with FIGS. 6–9 may be utilized in the measuring apparatus shown in FIGS. 1–5. This may be accomplished by omitting the flanges 72 and indicating material 74 from the apparatus shown in FIGS. 1–5, and by adding the outer wall 166, indicating strip 165, and opening 168, the operation of which is described in connection with FIGS. 6–9, to the apparatus of FIGS. 1–5.

Figures 10, 11, 12:
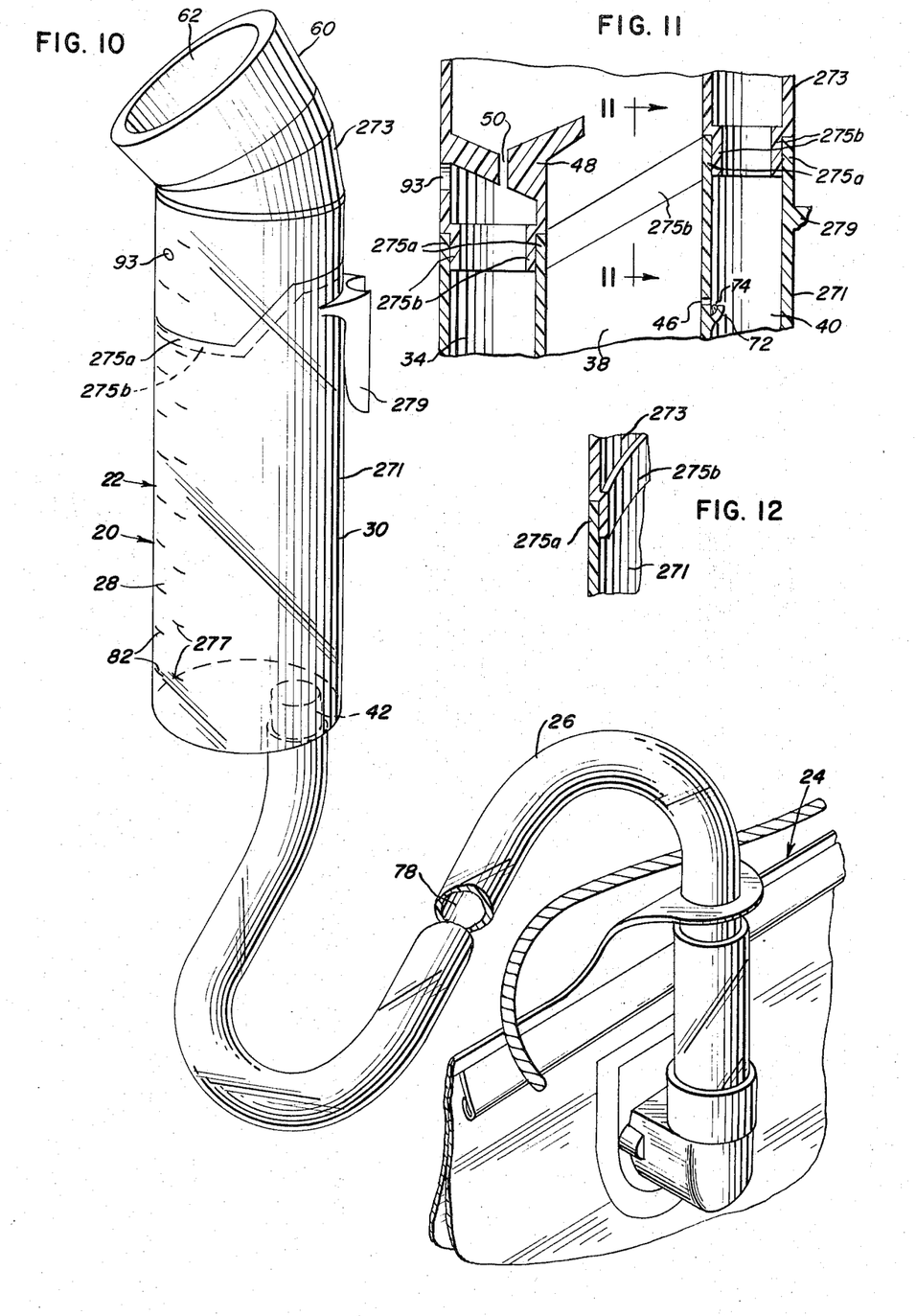
FIG. 10 is a fragmentary perspective view of another embodiment of the liquid measuring apparatus of the present invention.
FIG. 11 is a fragmentary sectional view of a receptacle in the measuring apparatus of FIG. 10.
FIG. 12 is a fragmentary sectional view taken substantially as indicated along the line 11—11 of FIG. 11.

Another embodiment of the invention is illustrated in FIGS. 10–12, which is similar to the embodiments of the liquid measuring apparatus previously described in connection with FIGS. 1–9, except that the valve means is eliminated in this embodiment, and an alternative means is provided for emptying the chamber. As shown in FIG. 10, the apparatus 20 includes a receptacle 22, a container or collection bag 24, and a conduit 26 communicating between the receptacle and container.

As illustrated in FIGS. 10–12, the receptacle 22 has a lower section 271 and an upper section 273 which is releasably secured to the lower section 271. The upper end of the lower section 271 and the lower end of the upper section 273 have mating flanges 275a and 275b, respectively, to releasably interlock the two sections together. The flange 275b of the upper section 273 is recessed in the chamber 34, in the channel 40, and around the periphery of the receptacle outer wall, such that the flange 275b is received in the upper end of the lower section 271 and is mated with the flange 275a. Preferably, the flanges 275a and b mate with each other in the channel 40 above the apertures, as shown in FIG. 11.

When the liquid discharge has been completed, the chamber 34 may be emptied by removing the upper section 273 from the lower section 271, thus exposing the liquid which has collected in the chamber 34. Once the liquid has been removed from the chamber 34, the sections 271 and 273 may be secured to each other for further use of the receptacle 22, if desired.

Since the liquid which has collected in the chamber 34 does not pass to the container 24 in this embodiment of the invention, the receptacle may be provided with additional indicia 277, as shown in FIG. 10, to indicate the volume of liquid collected in the chamber. Thus, the total volume of the liquid discharge may be determined by adding the volume collected in the chamber 34 and the container 24, as indicated by the respective indicia of the receptacle and container.

The receptacle 22 may also have a handle 279, as shown in FIG. 10, in order that the receptacle may be secured in position, such as to a pole, to facilitate voiding into the receptacle.

The foregoing detailed description is given for clearness of understanding only, and no unnecessary limitations should be understood therefrom, as modifications will be obvious to those skilled in the art.

We claim:
1. Apparatus for measuring a discharge of liquid, comprising:
    a hollow receptacle having an inlet port adjacent the upper end of the receptacle to receive the liquid discharge, said receptacle including, a cup-shaped pan below the inlet port to receive the liquid, said pan having a bore extending through the pan at a lower portion thereof, and an upper edge to direct overflow from the pan into a lower part of the receptacle, a chamber below said pan and communicating with the pan bore to collect liquid from the pan passing through the bore and measure the period of time of the liquid discharge, an upright wall in the receptacle at least partially defining the sides of a compartment below the pan edge to receive liquid overflowing from the pan and a channel adjacent said compartment, said wall having opening means communicating between said compartment and channel to permit passage of liquid from the compartment to the channel as the liquid collects in said compartment, means for draining liquid from said channel, and means for indicating the approximate maximum height of liquid collected in the compartment during the discharge to determine the approximate peak flow rate of the liquid discharge.

2. The measuring apparatus of claim 1 including means for directing the liquid discharge received through the inlet port into said pan.

3. The measuring apparatus of claim 2 wherein said directing means comprises, an inner baffle below the inlet port and above the pan to break the liquid discharge, with said baffle having a lower edge for directing the liquid into the pan.

4. The measuring apparatus of claim 3 wherein said receptacle includes a tapered portion adjacent the upper end of the receptacle to direct the liquid discharge against said baffle.

5. The measuring apparatus of claim 4 wherein said tapered portion directs the liquid discharge to a rearward part of the receptacle, said pan extends from a front wall of the receptacle, said baffle extends downwardly from a rear wall of the receptacle toward the front wall, and said baffle edge defines an opening between the baffle edge and the front wall above the pan.

6. The measuring apparatus of claim 1 including means for emptying collected liquid from said chamber.

7. The measuring apparatus of claim 6 including means for venting said chamber to facilitate emptying of the chamber.

8. The measuring apparatus of claim 6 wherein said emptying means comprises, valve means adjacent the lower end of said chamber for selectively opening and closing the chamber, and an exit tube communicating between the valve means and said channel for passing liquid from the opened valve means to the channel.

9. The measuring apparatus of claim 8 wherein said receptacle includes a depending tubular extension defining a lower portion of said channel, and said exit tube communicates with the channel in said tubular extension.

10. The measuring apparatus of claim 6 wherein said emptying means comprises upper and lower sections of said receptacle, said upper and lower sections being releasably secured to each other adjacent the upper end of the chamber and below the pan, whereby the upper section may be removed from the lower section for access to the liquid collected in said chamber.

11. The measuring apparatus of claim 10 wherein the upper end of said lower section and the lower end of the upper section have mating flanges to releasably secure the lower and upper sections together.

12. The measuring apparatus of claim 1 wherein said receptacle includes a partition separating said chamber and compartment.

13. The measuring apparatus of claim 1 including means for venting the channel to facilitate passage of liquid through the channel.

14. The measuring apparatus of claim 1 wherein said opening means comprises a plurality of vertically spaced apertures in said upright wall.

15. The measuring apparatus of claim 14 wherein said indicating means comprises a wettable material retained below each of said apertures in the channel.

16. The measuring apparatus of claim 14 wherein said indicating means comprises a liquid sensitive material retained below each of said apertures in the channel.

17. The measuring apparatus of claim 14 wherein said apertures are aligned vertically in said wall.

18. The measuring apparatus of claim 14 wherein the distance between the height of adjacent apertures is equal.

19. The measuring apparatus of claim 14 wherein the size of said apertures is equal.

20. The measuring apparatus of claim 1 wherein the opening means comprises a vertical slot in said upright wall.

21. The measuring apparatus of claim 1 wherein said indicating means comprises, a wall section in the receptacle defining a vertical passageway communicating with said compartment adjacent the lower end of the receptacle, and an indicating strip removably positioned in said passageway.

22. The measuring apparatus of claim 1 wherein said indicating means comprises, an outer and inner wall defining a vertical passageway in said receptacle, said inner wall separating said passageway and compartment and being spaced from the bottom of the receptacle to define a lower opening communicating between the passageway and the compartment, and an indicating strip removably positioned in said passageway.

23. The measuring apparatus of claim 1 including a container below said receptacle, and a conduit connecting said channel and container for passage of liquid from the channel to the container and collection therein.

24. The measuring apparatus of claim 23 including means for selectively emptying the collected liquid in said chamber into the container.

25. The measuring apparatus of claim 23 including indicia on said container indicating the volume of liquid collected in the container.

26. The measuring apparatus of claim 18 including indicia on said container indicating the volume of liquid connected in the container and a residual volume of liquid remaining in said compartment.

27. The measuring apparatus of claim 1 including indicia on said receptacle indicating the period of time for the liquid discharge by the height of liquid collected in the chamber.

28. The measuring apparatus of claim 1 including indicia on said receptacle indicating the volume of liquid collected in said chamber.

29. The measuring apparatus of claim 1 including indicia on said receptacle indicating the peak flow rate of the liquid discharge based on said indicating means.

30. The measuring apparatus of claim 1 wherein said compartment has a substantially uniform cross sectional area from the bottom of the compartment to slightly below said pan.

31. The measuring apparatus of claim 1 wherein said chamber has a substantially uniform cross sectional area from the bottom of the chamber to slightly below the bottom of said pan.

32. The measuring apparatus of claim 1 including means for venting said chamber to facilitate passage of liquid from the pan into the chamber.

33. Apparatus for measuring a discharge a liquid comprising, a hollow receptacle having a pair of spaced vertically disposed walls respectively defining first, second and third contiguous compartments in the receptacle, with the wall between the second and third compartments having opening means communicating between the second and third compartments and means for indicating the approximate maximum height of liquid passing through said opening means, a cupshaped pan covering the top of the first compartment and having a bore extending through a lower part of the pan to the first compartment and an upper edge adjacent the second compartment, an inlet port adjacent the upper end of the receptacle to receive the liquid discharge, a baffle below said port and having an edge above said pan to direct the liquid discharge into the pan, and means for draining liquid from the third compartment, whereby said liquid passes through the pan bore into the first compartment for collection and flows over the pan edge into the second compartment, and the liquid passes from the second to third compartments through the opening means.

34. The measuring apparatus of claim 33 including a container below the receptacle, and a conduit connecting the third compartment with the container.

35. The measuring apparatus of claim 34 including means for emptying the first compartment into the container.

36. Apparatus for measuring a discharge of liquid comprising:

a hollow receptacle including, a front wall portion;

a back wall portion;

a first vertical wall in the receptacle defining a first compartment intermediate the first wall and front wall portion;

a second vertical wall in the receptacle spaced from the first wall and at least partially defining with the first wall a second compartment in the receptacle, said second wall defining a third compartment intermediate the second wall and back wall portion, and having opening means communicating between the second and third compartments;

a baffle extending downwardly from the back wall portion above the second and third compartments and terminating above the first compartment;

a tapered portion adjacent the upper end of the receptacle to receive the liquid discharge and direct the discharge against the baffle;

a cup-shaped pan covering the first compartment adjacent the front wall portion to receive liquid from the baffle, said pan having a bore communicating with the first compartment for passage of liquid into the first compartment, and having an upper edge adjacent the second compartment to direct overflow of liquid from the pan into the second compartment, with the overflowing liquid passing from the second to third compartments through said opening means;

means for draining liquid from said third compartment, and means for indicating the approximate maximum height of liquid passing through the opening means.

* * * * *

UNITED STATES PATENT OFFICE
CERTIFICATE OF CORRECTION

Patent No. 3,859,854   Dated   January 14, 1975

Inventor(s) John F. Dye, William J. Binard, and Leonard R. Anglada

It is certified that error appears in the above-identified patent and that said Letters Patent are hereby corrected as shown below:

Column 1, line 13, change "360,219" to -- 360,213 -- .

Column 5, line 51, change "is" to -- in -- .

Signed and sealed this 18th day of March 1975.

(SEAL)
Attest:

RUTH C. MASON  
Attesting Officer

C. MARSHALL DANN  
Commissioner of Patents  
and Trademarks